US011143434B2

(12) United States Patent
Hikone et al.

(10) Patent No.: US 11,143,434 B2
(45) Date of Patent: Oct. 12, 2021

(54) REFRIGERATION CYCLE APPARATUS

(71) Applicant: Mitsubishi Electric Corporation, Tokyo (JP)

(72) Inventors: Takahito Hikone, Tokyo (JP); Yasushi Okoshi, Tokyo (JP); Takuya Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 22 days.

(21) Appl. No.: 16/472,941

(22) PCT Filed: Feb. 10, 2017

(86) PCT No.: PCT/JP2017/004974
§ 371 (c)(1),
(2) Date: Jun. 24, 2019

(87) PCT Pub. No.: WO2018/146800
PCT Pub. Date: Aug. 16, 2018

(65) Prior Publication Data
US 2019/0353401 A1 Nov. 21, 2019

(51) Int. Cl.
*F24H 9/20* (2006.01)
*F24H 4/02* (2006.01)
*F25B 13/00* (2006.01)

(52) U.S. Cl.
CPC .............. *F24H 9/2007* (2013.01); *F24H 4/02* (2013.01); *F25B 13/00* (2013.01);
(Continued)

(58) Field of Classification Search
CPC .......... F24H 4/02; F24H 9/2007; F25B 13/00; F25B 2700/19; F25B 2600/2501; F25B 25/005; F24D 3/18
See application file for complete search history.

(56) References Cited

U.S. PATENT DOCUMENTS

2012/0029707 A1* 2/2012 Dazai ................. F24D 19/1048
700/282
2013/0219936 A1 8/2013 Yamamoto et al.
(Continued)

FOREIGN PATENT DOCUMENTS

CN 205783796 U * 12/2016 ............... F24D 3/18
EP 2 325 570 A2 5/2011
(Continued)

OTHER PUBLICATIONS

Machine Translation of Ma (Year: 2016).*
(Continued)

*Primary Examiner* — Frantz F Jules
*Assistant Examiner* — Rodrigo Royo
(74) *Attorney, Agent, or Firm* — Posz Law Group, PLC

(57) ABSTRACT

A refrigeration cycle apparatus includes: a compressor configured to compress refrigerant and discharge the refrigerant to a refrigerant pipe; an air heat exchanger configured to exchange heat between air and the refrigerant flowing through the refrigerant pipe; an expansion valve configured to adjust pressure of the refrigerant flowing through the refrigerant pipe; a water heat exchanger configured to exchange heat between water supplied from the water return header pipe and the refrigerant and send out the water to the water delivery header pipe; an outlet pressure sensor provided on a water outlet side of the water heat exchanger and configured to measure water pressure; and a controller, in which the controller controls an opening degree of the bypass valve such that a value of water pressure measured by the outlet pressure sensor is equal to a preset target value.

15 Claims, 8 Drawing Sheets

(52) U.S. Cl.
CPC ... *F25B 2600/13* (2013.01); *F25B 2600/2501* (2013.01); *F25B 2700/19* (2013.01)

(56) References Cited

U.S. PATENT DOCUMENTS

2014/0260388 A1\* 9/2014 Umeda .................. F25B 49/02
62/208
2017/0370324 A1\* 12/2017 Shibata .................... F02G 5/00

FOREIGN PATENT DOCUMENTS

| | | | | | |
|---|---|---|---|---|---|
| JP | 2004-184052 | A | | 7/2004 | |
| JP | 2004184052 | A | \* | 7/2004 | ............. F24F 11/02 |
| JP | 2010-236786 | A | | 10/2010 | |
| JP | 2011-112235 | A | | 6/2011 | |
| JP | 2011-153809 | A | | 8/2011 | |
| JP | 2013-108695 | A | | 6/2013 | |
| WO | 2012/050087 | A1 | | 4/2012 | |
| WO | WO-2012050087 | A1 | \* | 4/2012 | ............. F24F 11/89 |

OTHER PUBLICATIONS

Machine Translation of Matsumoto (Year: 2012).\*
Machine Translation of Tanaka (Year: 2002).\*
International Search Report of the International Searching Authority dated May 16, 2017 for the corresponding International application No. PCT/JP2017/004974 (and English translation).
Office Action dated Apr. 28, 2020 issued in corresponding JP patent application No. 2018-566723 (and English translation).

\* cited by examiner

REFRIGERATION CYCLE APPARATUS

CROSS REFERENCE TO RELATED APPLICATION

This application is a U.S. national stage application of PCT/JP2017/004974 filed on Feb. 10, 2017, the contents of which are incorporated herein by reference.

TECHNICAL FIELD

The present invention relates to a refrigeration cycle apparatus configured to produce cold water and hot water. The refrigeration cycle apparatus is provided with a water heat exchanger configured to cool and heat water by exchanging heat between refrigerant and water.

BACKGROUND ART

An air-cooled heat pump system is configured such that a refrigeration cycle apparatus including a heat source apparatus is connected to a load by a water pipe via a water return header pipe and a water delivery header pipe. The air-cooled heat pump system produces cold water by cooling water and provides the produced cold water to a load. Also, the air-cooled heat pump system produces hot water by heating water and provides the produced hot water to the load.

To provide cold water and hot water to a load at a constant flow rate, it is necessary to keep pressure difference between water pressure in the water return header pipe and water pressure in the water delivery header pipe constant. Therefore, the water return header pipe and water delivery header pipe are connected with each other by a bypass pipe, and a bypass valve is provided at the bypass pipe. Also, a pressure difference gauge for use to measure the pressure difference is provided between the water return header pipe and water delivery header pipe. Furthermore, when the air-cooled heat pump system is a simplex pump system, a pump configured to send water to the heat source apparatus is provided at a water pipe connecting the water return header pipe with the heat source apparatus. Using such a configuration, an opening degree of the bypass valve and operating frequency of the pump are controlled such that the pressure difference between water pressure in the water return header pipe and water pressure in the water delivery header pipe reaches a target value.

Patent Literature 1 discloses an example of a heat source control system in which a pressure difference gauge is provided between headers although the system is a two-pump system. Patent Literature 1 also discloses another configuration example for pressure difference adjustment, in which a pressure sensor is provided on a primary water delivery header on the side of the heat source apparatus to control the opening degree of the bypass valve using a value measured by the pressure sensor.

CITATION LIST

Patent Literature

Patent Literature 1: Japanese Unexamined Patent Application Publication No. 2011-153809

SUMMARY OF INVENTION

Technical Problem

With the heat source control system disclosed in Patent Literature 1, installation of the system requires the work of mounting the pressure difference gauge or pressure sensor on the header on site. This, for example, not only requires working space for an operator to mount the pressure difference gauge between the headers, but also increases installation cost by the cost of mounting the pressure difference gauge.

The present invention has been made to solve the above problem and has an object to provide a refrigeration cycle apparatus that eliminates the need for the work of mounting a pressure difference gauge between headers during installation of the apparatus.

Solution to Problem

According to an embodiment of the present invention, there is provided a refrigeration cycle apparatus that is connected to a load through a water return header pipe and a water delivery header pipe connected with each other by a bypass pipe at which a bypass valve is provided, the refrigeration cycle apparatus comprising: a compressor configured to compress refrigerant and discharge the refrigerant to a refrigerant pipe; an air heat exchanger configured to exchange heat between air and the refrigerant flowing through the refrigerant pipe; an expansion valve configured to adjust pressure of the refrigerant flowing through the refrigerant pipe; a water heat exchanger configured to exchange heat between water supplied from the water return header pipe and the refrigerant and send out the water to the water delivery header pipe; an outlet pressure sensor provided on a water outlet side of the water heat exchanger and configured to measure water pressure; and a controller configured to control the compressor and the expansion valve, wherein the controller is configured to control an opening degree of the bypass valve such that a value of water pressure measured by the outlet pressure sensor is equal to a preset target value.

Advantageous Effects of Invention

Since the value of water pressure measured by the outlet pressure sensor provided on the water outlet side of the water heat exchanger is equal to the pressure difference between the water pressure in the water return header pipe and the water pressure in the water delivery header pipe, the embodiment of the present invention makes it possible to control the opening degree of the bypass valve using the measured water pressure value and eliminates the need for the work of mounting a pressure difference gauge between headers during installation of the apparatus.

DESCRIPTION OF EMBODIMENTS

Embodiment 1

Figure 1:
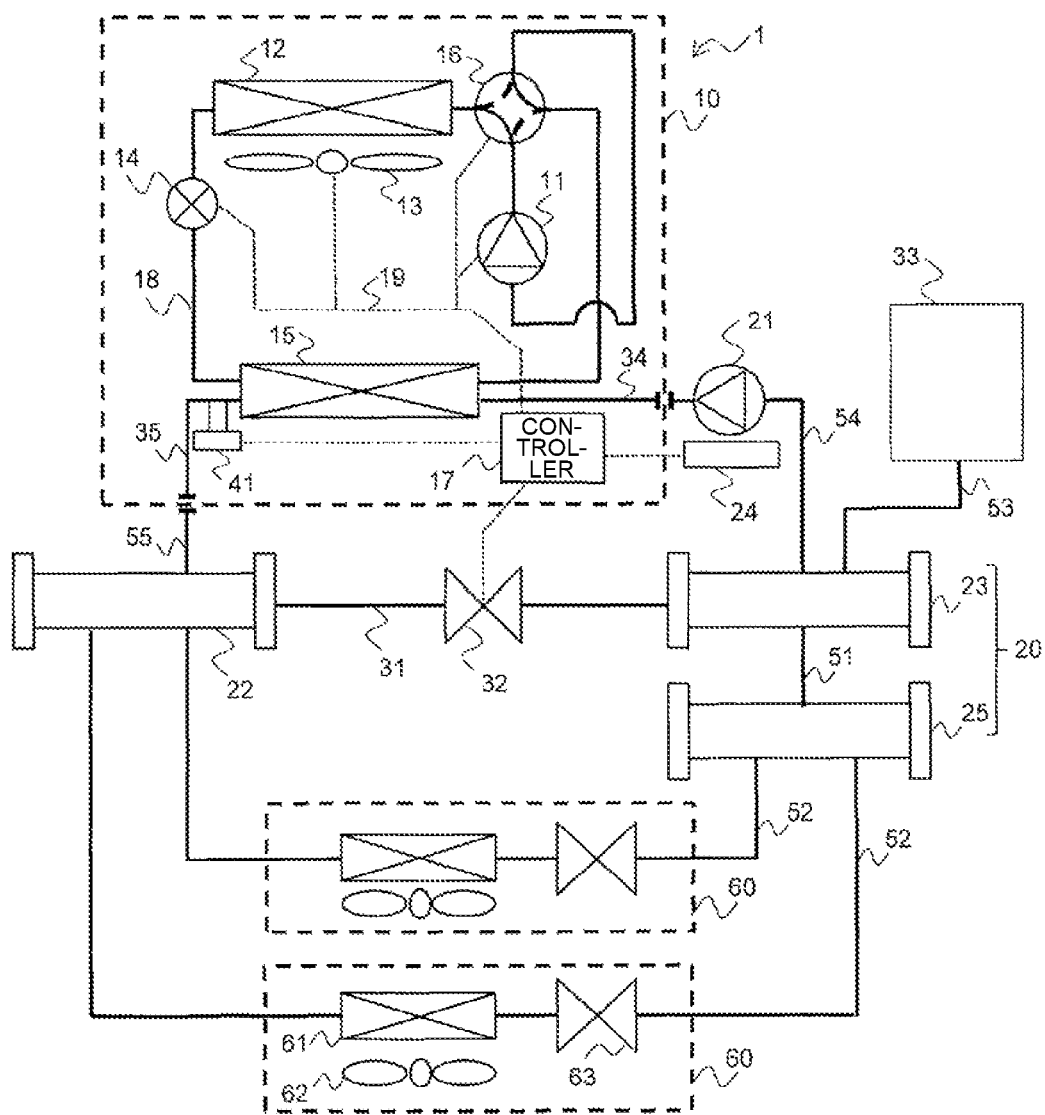
FIG. 1 is a circuit diagram showing a configuration example of an air-cooled heat pump system including a refrigeration cycle apparatus according to Embodiment 1 of the present invention.

A configuration of a refrigeration cycle apparatus according to Embodiment 1 will be described. FIG. 1 is a circuit diagram showing a configuration example of an air-cooled heat pump system including the refrigeration cycle apparatus according to Embodiment 1 of the present invention. The air-cooled heat pump system shown in FIG. 1 is an example of a simplex pump system. The air-cooled heat pump system includes a refrigeration cycle apparatus 1, a water delivery header pipe 22, water return header pipes 20, and a tank 33. The refrigeration cycle apparatus 1 is an example of an air-cooled heat pump chiller. A refrigeration cycle apparatus 1 includes a heat source apparatus 10 shown in FIG. 1. The heat source apparatus 10 is connected to a load through the water delivery header pipe 22 and one of the water return header pipes 20.

The water return header pipes 20 include a water return header pipe 23 connected to the heat source apparatus 10 and a water return header pipe 25 connected to the load. The water return header pipe 23 and water return header pipe 25 are connected by a water pipe 51. Through a water pipe 53, the water return header pipe 23 is connected with the tank 33 configured to store water. According to Embodiment 1, the tank 33 is an open tank. In the configuration example shown in FIG. 1, loads are two fan coil units 60. Each of the fan coil units 60 includes a heat exchanger 61, a fan 62, and an on-off valve 63. The fan coil units 60 are provided on water pipes 52 configured to connect the water return header pipe 25 to the water delivery header pipe 22. The water flowing from the water delivery header pipe 22 to the fan coil units 60 through the water pipes 52 exchanges heat with air and returns to the water return header pipe 25 through the water pipes 52.

The water return header pipe 23 and water delivery header pipe 22 are connected with each other by a bypass pipe 31. The bypass pipe 31 is provided with a bypass valve 32 configured to adjust pressure difference between water pressure in the water return header pipe 23 and water pressure in the water delivery header pipe 22. The water return header pipe 23 is connected to the heat source apparatus 10 through a water pipe 54. At the water pipe 54 is provided a pump 21 configured to send out water supplied from the water return header pipe 23 to the heat source apparatus 10. The pump 21 is provided with an inverter 24 configured to drive a motor of the pump 21. The water delivery header pipe 22 is connected to the heat source apparatus 10 through a water pipe 55.

The heat source apparatus 10 includes a compressor 11, a four-way valve 16, an air heat exchanger 12, a fan 13, an expansion valve 14, a water heat exchanger 15, and a controller 17. The compressor 11, four-way valve 16, air heat exchanger 12, expansion valve 14, and water heat exchanger 15 are connected by a refrigerant pipe 18. Specifically, one of four connection ports of the four-way valve 16 is connected to a suction port of the compressor 11, and another connection port is connected to a discharge port of the compressor 11. One of the rest, that is, one of the two connection ports is connected to the other connection port via the air heat exchanger 12, expansion valve 14, and water heat exchanger 15.

The water heat exchanger 15 is connected with water pipes 34 and 35. The water heat exchanger 15 is connected with the pump 21 through the water pipes 34 and 54. Also, the water heat exchanger 15 is connected with the water delivery header pipe 22 through the water pipes 35 and 55. According to Embodiment 1, an outlet pressure sensor 41 configured to measure water pressure is provided on the water pipe 35 at a water outlet side of the water heat exchanger 15. The outlet pressure sensor 41 is provided on the heat source apparatus 10.

Also, according to Embodiment 1, the water pipes 34 and 35, water delivery header pipe 22, water return header pipe 23, and tank 33 are provided at a substantially equal height from the ground. This will be described specifically. Regarding the heights at which components are provided, that is, the height from the ground at which the water heat exchanger 15, water pipes 34 and 35, water delivery header pipe 22, and water return header pipe 23 are provided, a difference between a maximum value and a minimum value of each height is, for example, within 100 cm. The tank 33 is provided above, e.g., 100 to 200 cm above, a water circuit including the water heat exchanger 15, water pipes 34 and 35, water delivery header pipe 22, and water return header pipe 23. A reason why the tank 33 is provided above the water circuit is to replenish the water circuit with water from the tank 33 when the water circuit runs short of water. It is sufficient if there is enough difference in installation height between the water circuit and tank 33 to replenish the water circuit with water from the tank 33, and there is no need that the difference will be so great as to create high pressure. Thus, it can be said that the water circuit and tank 33 are provided at a substantially equal height from the ground.

Now, components of the heat source apparatus 10 will be described. The compressor 11 compresses and discharges suctioned refrigerant. The air heat exchanger 12 exchanges heat between air and refrigerant. The four-way valve 16 switches refrigerant flow paths. The fan 13 supplies outside air to the air heat exchanger 12. The expansion valve 14 adjusts refrigerant pressure. The water heat exchanger 15 exchanges heat between the water supplied from the water return header pipe 23 and the refrigerant and sends out the water to the water delivery header pipe 22.

Figure 2:
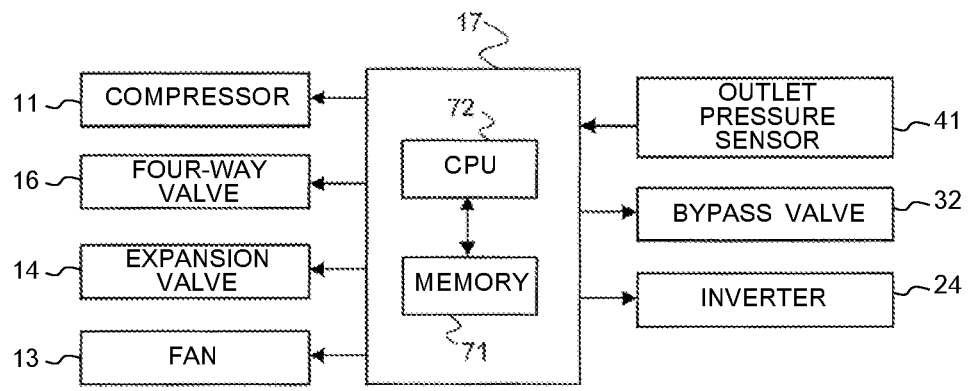
FIG. 2 is a block diagram showing a configuration example of a controller shown in FIG. 1.

FIG. 2 is a block diagram showing a configuration example of a controller shown in FIG. 1. The controller 17 includes a memory 71 configured to store programs used for refrigeration cycle control and other control, and a CPU (Central Processing Unit) 72 configured to perform processing according to the programs. The memory 71 also stores information about a target value for the pressure difference between the water pressure in the water return header pipe 23 and the water pressure in the water delivery header pipe 22 as well as an allowable range of the pressure difference. The controller 17 is, for example, a microcomputer.

As shown in FIG. 1, the controller 17 is connected with the compressor 11, four-way valve 16, expansion valve 14, fan 13, outlet pressure sensor 41, bypass valve 32, and inverter 24 through signal lines 19. In FIG. 1, the signal lines 19 are indicated by broken lines. The controller 17 is configured to cause the four-way valve 16 to switch the refrigerant flow paths according to operational status such as cooling operation and heating operation. Based on temperatures and preset temperatures of the water flowing through the fan coil units 60, the controller 17 controls operating frequencies of the compressor 11 and fan 13 and the opening degree of the expansion valve 14. The controller 17 controls an opening degree of the bypass valve 32 based on the water pressure measured by the outlet pressure sensor 41 and the target value stored in the memory 71, and controls operating frequency of the pump 21 via the inverter 24.

Note that in FIG. 1, which shows a configuration in which the air-cooled heat pump system includes the water return header pipes 23 and 25, the water return header pipe 25 does not have to be provided. Also, although it is assumed that the controller 17 controls the opening degree of the bypass valve 32 and the operating frequency of the pump 21, the controller 17 may control only one of the controlled objects.

Figure 3:
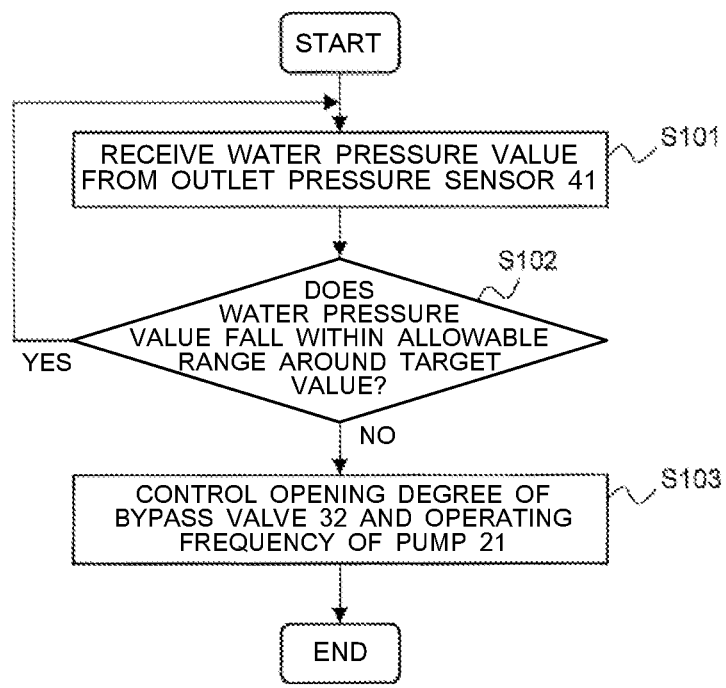
FIG. 3 is a flowchart showing operating procedures of the refrigeration cycle apparatus according to Embodiment 1 of the present invention.

Next, operation of the refrigeration cycle apparatus 1 of Embodiment 1 will be described. FIG. 3 is a flowchart showing operating procedures of the refrigeration cycle apparatus according to Embodiment 1 of the present invention. The controller 17 receives a water pressure value from the outlet pressure sensor 41 at every predetermined time interval (step S101). According to Embodiment 1, the pump 21 is provided outside the heat source apparatus 10. Also, the tank 33 connected to the water return header pipe 23 is an open tank. Under these circumstances, since the water pipes 34 and 35, water delivery header pipe 22, water return header pipe 23, and tank 33 are provided at a substantially equal height from the ground, water pressure in the water pipe 54 running from the water return header pipe 23 to the pump 21 is almost equal to zero. Consequently, the value of water pressure measured by the outlet pressure sensor 41 is equal to the pressure difference between the water pressure in the water delivery header pipe 22 and the water pressure in the water return header pipe 23.

The controller 17 compares the water pressure value received in step S101 with the target value stored in the memory 71, and determines whether the water pressure value falls within the allowable range from the target value (step S102). When it is found as a result of the determination that the water pressure value does not fall within the allowable range, the controller 17 controls the opening degree of the bypass valve 32 and the operating frequency of the pump 21 such that the value of water pressure measured by the outlet pressure sensor 41 is equal to the target value (step S103). For example, if the water pressure value exceeds the allowable range, the controller 17 increases the opening degree of the bypass valve 32 and reduces the operating frequency of the pump 21 to decrease the pressure difference. When the water pressure value is lower than the allowable range, the controller 17 reduces the opening degree of the bypass valve 32 and increases the operating frequency of the pump 21 to increase the pressure difference. When it is found as a result of the determination in step S102 that the water pressure value falls within the allowable range, the controller 17 returns to step S101.

Note that the controller 17 may correct the target value using information about a positional relationship among the water pipes 34 and 35, water delivery header pipe 22, water return header pipe 23, and tank 33 in a height direction. For example, if a difference in installation height between the water circuit including the water pipes 34 and 35, water delivery header pipe 22, and water return header pipe 23 and the tank 33 is great, the controller 17 can correct the target value by converting the difference in installation height into water pressure. Information about the positional relationship among these components may be stored in the memory 71 or registered in the memory 71 by an operator. As parameters for use to calculate the water pressure, the memory 71 may store information such as information about pipe diameter of the water pipe 53 and basal area of the tank 33 in addition to the information about the positional relationship among the above components.

The refrigeration cycle apparatus 1 of Embodiment 1 includes the compressor 11, the air heat exchanger 12, the expansion valve 14, the water heat exchanger 15 configured to exchange heat between the water supplied from the water return header pipe 23 and the refrigerant and send out the water to the water delivery header pipe 22, the outlet pressure sensor 41 provided on a water outlet side of the water heat exchanger 15 and configured to measure water pressure, and the controller 17, wherein the controller 17 controls the opening degree of the bypass valve 32 such that the value of water pressure measured by the outlet pressure sensor is equal to a preset target value.

According to Embodiment 1, since the value of water pressure measured by the outlet pressure sensor 41 provided on the water outlet side of the water heat exchanger 15 is equal to the pressure difference between the water pressure in the water return header pipe 23 and the water pressure in the water delivery header pipe 22, it is sufficient to control the opening degree of the bypass valve 32 such that the measured water pressure value is equal to a target value. Consequently, there is no need to provide a pressure difference gauge between the water return header pipe 23 and water delivery header pipe 22. This eliminates the need for the operator's work of mounting a pressure difference gauge between headers during installation of the refrigeration cycle apparatus 1 and eliminates the need for working space for such work as well. Also, not only installation cost can be reduced by the cost of mounting the pressure difference gauge, but also the period of installation work can be shortened.

Also, when the controller 17 is connected with the pump 21 via a signal line, the opening degree of the bypass valve 32 and the operating frequency of the pump 21 can be controlled such that the water pressure value indicated by the outlet pressure sensor 41 is equal to a target value. Even though the pump 21 is provided outside the heat source apparatus 10, the controller 17 can adjust a difference in water pressure between the headers by controlling the operating frequency of the pump 21.

Also, according to Embodiment 1, the tank 33 connected to the water return header pipe 20 through the water pipe 53 is an open tank. The use of the open tank for the tank 33 for water replenishment makes it easier for the controller 17 to calculate the pressure difference between the headers than when a closed tank is used. It also becomes easier to correct the target value. When the tank 33 is an open tank, atmospheric pressure acts on a water surface of the tank 33, and water pressure fluctuations occurring in the water circuit including the water return header pipe 20 is absorbed into the atmosphere from the tank 33. Therefore, the water pressure in the water return header pipe 20 depends mainly on the positional relationship between the water return header pipe 20 and tank 33 as described above. On the other hand, when the tank 33 is a closed tank, because the tank 33 is enclosed while being filled with water, water pressure fluctuations occurring in the water circuit has no way out, and it is considered that the fluctuations are transmitted to the water return header pipe 20. In this case, it is difficult for the controller 17 to predict the water pressure fluctuations occurring in the water return header pipe 20.

Furthermore, according to Embodiment 1, the water heat exchanger 15, water pipes 34 and 35, water return header pipe 20, and water delivery header pipe 22 are provided at a substantially equal height from the ground. Consequently, the value of water pressure measured by the outlet pressure sensor 41 is equal to the pressure difference between the water pressure in the water delivery header pipe 22 and water pressure in the water return header pipe 20.

Embodiment 2

In Embodiment 2, a refrigeration cycle apparatus includes a plurality of the heat source apparatuses 10 described in Embodiment 1. In Embodiment 2, components similar to those in Embodiment 1 are denoted by the same reference numerals as the corresponding components in Embodiment 1, and detailed description thereof will be omitted. However, if components denoted by the same reference numerals as components described in Embodiment 1 differ partially from the corresponding components, the differences will be described in detail.

Figure 4:
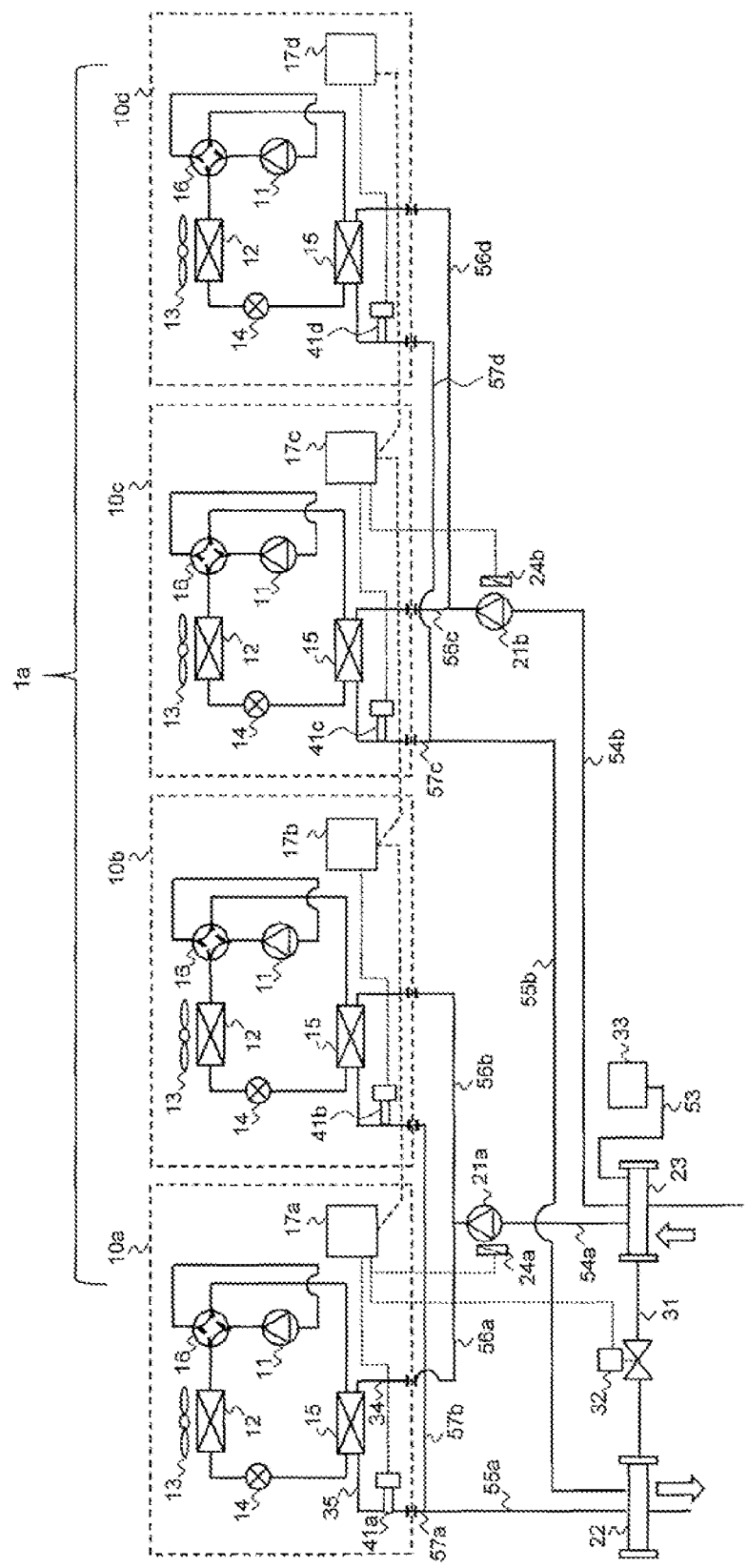
FIG. 4 is a circuit diagram showing a configuration example of an air-cooled heat pump system including a refrigeration cycle apparatus according to Embodiment 2 of the present invention.

A configuration of the refrigeration cycle apparatus according to Embodiment 2 will be described. FIG. 4 is a circuit diagram showing a configuration example of an air-cooled heat pump system including the refrigeration cycle apparatus according to Embodiment 2 of the present invention. In FIG. 4, load-side components are omitted. The air-cooled heat pump system shown in FIG. 4 is an example of a simplex pump system. The air-cooled heat pump system includes a refrigeration cycle apparatus 1a, which includes heat source apparatuses 10a to 10d. The heat source apparatuses 10a to 10d correspond to the heat source apparatus 10 described in Embodiment 1. According to Embodiment 2, the number of heat source apparatuses 10 is four, and two each of the heat source apparatuses 10 are connected with one pump 21, but the number ratio between the heat source apparatuses 10 and pumps 21 is not limited to this. For example, the heat source apparatuses 10 and pumps 21 may be connected in a one-to-one relationship.

A connection configuration of the water pipes in the air-cooled heat pump system will be described with reference to FIG. 4. The water return header pipe 23 is connected with water pipes 54a and 54b. A pump 21a is provided on the water pipe 54a. The water pipe 54a is divided into branch pipes 56a and 56b. The branch pipe 56a is connected to the heat source apparatus 10a. The branch pipe 56b is connected to the heat source apparatus 10b. A branch pipe 57a connected to the heat source apparatus 10a and a branch pipe 57b connected to the heat source apparatus 10b join a water pipe 55a. The water pipe 55a is connected to the water delivery header pipe 22. The pump 21a is provided with an inverter 24a configured to drive a motor of the pump 21a.

A pump 21b is provided on the water pipe 54b. The water pipe 54b is divided into branch pipes 56c and 56d. The branch pipe 56c is connected to the heat source apparatus 10c. The branch pipe 56d is connected to the heat source apparatus 10d. A branch pipe 57c connected to the heat source apparatus 10c and a branch pipe 57d connected to the heat source apparatus 10d join a water pipe 55b. The water pipe 55b is connected to the water delivery header pipe 22. The pump 21b is provided with an inverter 24b configured to drive a motor of the pump 21b.

Next, configurations of the heat source apparatuses 10a to 10d will be described with reference to FIG. 4. In the heat source apparatuses 10a to 10d, components of a refrigerant circuit are connected by the refrigerant pipe 18 as described with reference to FIG. 1. Of the water pipes 34 and 35 connected to the water heat exchanger 15 in the heat source apparatus 10a, the water pipe 34 is connected to the branch pipe 56a while the water pipe 35 is connected to the branch pipe 57a. Of the water pipes 34 and 35 connected to the water heat exchanger 15 in the heat source apparatus 10b, the water pipe 34 is connected to the branch pipe 56b while the water pipe 35 is connected to the branch pipe 57b. Of the water pipes 34 and 35 connected to the water heat exchanger 15 in the heat source apparatus 10c, the water pipe 34 is connected to the branch pipe 56c while the water pipe 35 is connected to the branch pipe 57c. Of the water pipes 34 and 35 connected to the water heat exchanger 15 in the heat source apparatus 10d, the water pipe 34 is connected to the branch pipe 56d while the water pipe 35 is connected to the branch pipe 57d.

Also, according to Embodiment 2, in the heat source apparatus 10a, the water pipe 35 connected to the water heat exchanger 15 is provided with an outlet pressure sensor 41a. In the heat source apparatus 10b, the water pipe 35 connected to the water heat exchanger 15 is provided with an outlet pressure sensor 41b. In the heat source apparatus 10c, the water pipe 35 connected to the water heat exchanger 15 is provided with an outlet pressure sensor 41c. In the heat source apparatus 10d, the water pipe 35 connected to the water heat exchanger 15 is provided with an outlet pressure sensor 41d. Note that according to Embodiment 2, the water pipes 34 and 35 of the heat source apparatuses 10a to 10d, the water delivery header pipe 22, the water return header pipe 23, and the tank 33 are provided at a substantially equal height from the ground.

The heat source apparatuses 10a to 10d are provided with respective controllers 17a to 17d. The controllers 17b to 17d are connected to the controller 17a via signal lines. The controllers 17a to 17d are, for example, microcomputers. The controllers 17a to 17d have configurations similar to the controller 17 described in Embodiment 1, and differences from the controller 17 will mainly be described below.

The controller 17a controls a refrigeration cycle of a refrigerant circuit in the heat source apparatus 10a. The controller 17b controls a refrigeration cycle of a refrigerant circuit in the heat source apparatus 10b. The controller 17c controls a refrigeration cycle of a refrigerant circuit in the heat source apparatus 10c. The controller 17d controls a refrigeration cycle of a refrigerant circuit in the heat source apparatus 10d. The controller 17a is connected with the outlet pressure sensor 41a, inverter 24a, and bypass valve 32 via signal lines. The controller 17b is connected with the outlet pressure sensor 41b via a signal line. The controller 17c is connected with the outlet pressure sensor 41c and inverter 24c via signal lines. The controller 17d is connected with the outlet pressure sensor 41d via a signal line. The controllers 17b to 17d transmit water pressure values measured by the respective outlet pressure sensors 41b to 41d to the controller 17a at every predetermined time interval.

The controller 17a calculates an average of values of water pressure measured by the outlet pressure sensors 41a to 41d, controls the opening degree of the bypass valve 32 and the operating frequencies of the pumps 21a and 21b via the respective inverters 24a and 24b based on the average value and the target value stored in the memory 71. When controlling the operating frequency of the pump 21b, the controller 17a transmits control information indicating the operating frequency to the controller 17c. Based on the control information received from the controller 17a, the controller 17c controls the operating frequency of the pump 21b via the inverter 24b.

Note that although in Embodiment 2, description is given of a case in which the controller 17a calculates the average value of the water pressure values collected from the outlet pressure sensors 41a to 41d and controls the opening degree of the bypass valve 32 and the operating frequencies of the pumps 21a and 21b, this may be done by another controller. Also, although description is given of a case in which the controller 17a controls the pump 21b via the controller 17c, the controller 17a and inverter 24b may be interconnected via a signal line. In that case, the controller 17a may control the operating frequency of the pump 21b directly. Furthermore, a single controller having functions of the controllers 17a to 17d may be provided on the refrigeration cycle apparatus 1a instead of the controllers 17a to 17d. The object controlled to adjust the difference in water pressure between the headers may be at least any one of the bypass valve 32 and the pumps 21a to 21d in operation.

Figure 5:
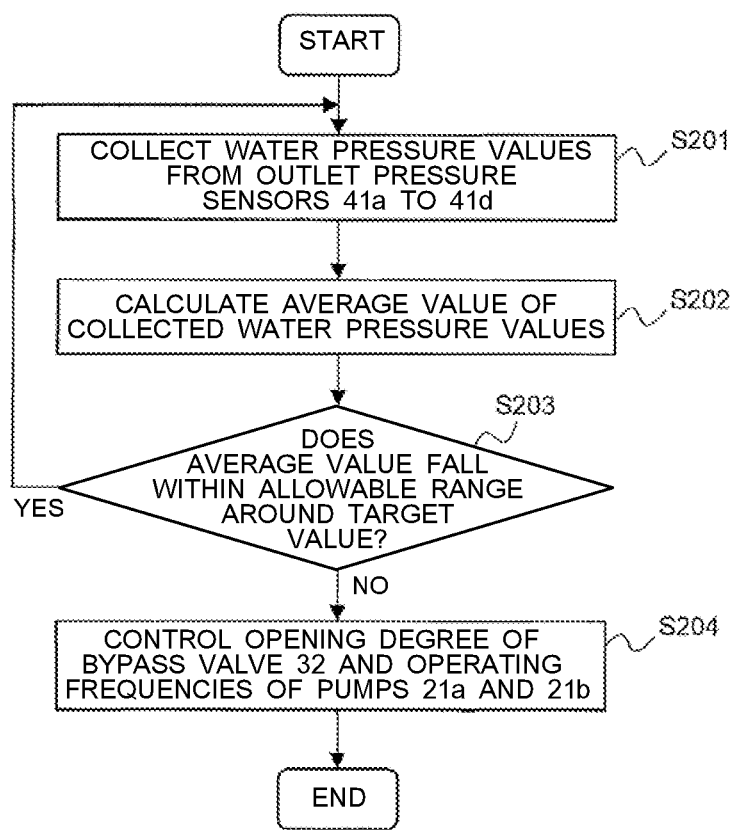
FIG. 5 is a flowchart showing operating procedures of the refrigeration cycle apparatus according to Embodiment 2 of the present invention.

Next, operation of the refrigeration cycle apparatus 1a of Embodiment 2 will be described. FIG. 5 is a flowchart showing operating procedures of the refrigeration cycle apparatus according to Embodiment 2 of the present invention. At every predetermined time interval, the controller 17a receives a water pressure value from the outlet pressure sensor 41a, and the water pressure values measured by the outlet pressure sensors 41b to 41d from the controllers 17b to 17d, and thereby collects the water pressure values from the outlet pressure sensors 41a to 41d (step S201). Then, the controller 17a calculates the average value of the collected water pressure values (step S202).

According to Embodiment 2, the pumps 21a to 21b are provided outside the heat source apparatuses 10a to 10d and the tank 33 connected to the water return header pipe 23 is an open tank. Under these conditions, since the tank 33, the water return header pipe 23, the water delivery header pipe 22, and the water pipes 34 and 35 of the heat source apparatuses 10a to 10d are provided at a substantially equal height, the water pressure in the water pipes 54 running from the water return header pipe 23 to the pumps 21a and 21b is almost equal to zero. Consequently, the average value of the water pressure values measured by the outlet pressure sensors 41a to 41d is equal to the pressure difference between the water pressure in the water delivery header pipe 22 and the water pressure in the water return header pipe 23.

The controller 17a compares the average value calculated in step S202 with the target value stored in the memory 71 and determines whether the average value falls within the allowable range from the target value (step S203). When it is found as a result of the determination that the average value does not fall within the allowable range, the controller 17a controls the opening degree of the bypass valve 32 and the operating frequencies of the pumps 21a and 21b such that the average value of the water pressure values measured by the outlet pressure sensors 41a to 41d is equal to the target value (step S204).

For example, when the average value exceeds the allowable range, to decrease the pressure difference, the controller 17a increases the opening degree of the bypass valve 32 and reduces the operating frequency of at least one of the pumps 21a and 21b in operation. When the average value is lower than the allowable range, to increase the pressure difference, the controller 17a reduces the opening degree of the bypass valve 32 and increases the operating frequency of at least one of the pumps 21a and 21b in operation. When it is found as a result of the determination in step S203 that the average value falls within the allowable range, the controller 17a returns to step S201.

Note that when operation of any of the pumps 21a and 21b is stopped, in step S202 shown in FIG. 5, the controller 17a calculates the average value using the water pressure value indicated by the outlet pressure sensor of the heat source apparatus connected to the pump in operation. For example, if the pump 21b is stopped while the pump 21a is in operation, in step S202, the controller 17a calculates the average value using the water pressure values indicated by the outlet pressure sensors 41a and 41b. Also, in Embodiment 2, description has been given of a case in which plural heat source apparatuses, namely four heat source apparatuses, are provided on the refrigeration cycle apparatus 1a, the number of heat source apparatuses is not limited to four. Furthermore, a single heat source apparatus may be provided on the refrigeration cycle apparatus 1a.

In the refrigeration cycle apparatus 1a of Embodiment 2, the plural heat source apparatuses 10a to 10d are provided and as a value to be compared with the target value, the controller 17a uses the average value of the water pressure values collected from the plural outlet pressure sensors 41a to 41d. The average value of the water pressure values collected from the plural outlet pressure sensors 41a to 41d is equal to the pressure difference between the water pressure in the water return header pipe 23 and the water pressure in the water delivery header pipe 22. Therefore, if the controller 17a controls the opening degree of the bypass valve 32 using the average value of the water pressure values, the difference in water pressure between the headers is adjusted and the need for the work of mounting a pressure difference gauge between the headers is eliminated. Consequently, even though there are plural heat source apparatuses, advantageous effects similar to those of Embodiment 1 are available.

Also, if connected with the pumps 21a and 21b via signal lines, the controller 17a may control the opening degree of the bypass valve 32 and the operating frequencies of the pumps 21a and 21b such that the average value of the water pressure values indicated by the outlet pressure sensors 41a to 41d is equal to the target value. Even though the pumps 21a and 21b are provided outside the heat source apparatuses 10a to 10d, the controller 17a, which is connected with the pumps 21a and 21b via signal lines, can adjust any difference in water pressure between the headers by controlling the operating frequencies of the pumps 21a and 21b.

Embodiment 3

In Embodiment 3, a refrigeration cycle apparatus includes a plurality of the heat source apparatuses 10 described in Embodiment 1 and the heat source apparatuses 10 include respective pumps 21. In Embodiment 3, components similar to those in Embodiments 1 and 2 are denoted by the same reference numerals as the corresponding components in Embodiments 1 and 2, and detailed description thereof will be omitted. However, if components denoted by the same reference numerals as components described in Embodiments 1 and 2 differ partially from the corresponding components, the differences will be described in detail.

Figure 6:
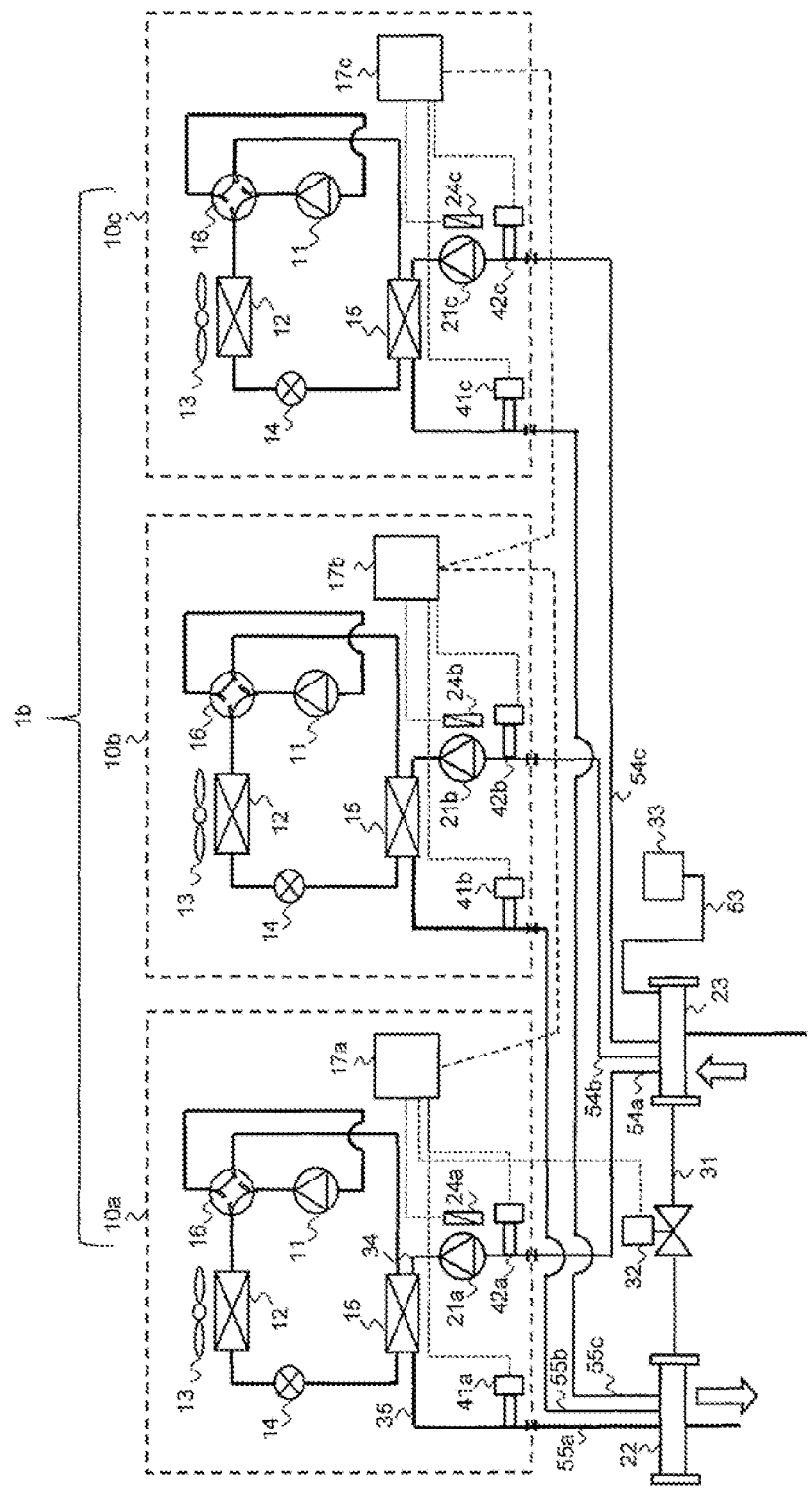
FIG. 6 is a circuit diagram showing a configuration example of an air-cooled heat pump system including a refrigeration cycle apparatus according to Embodiment 3 of the present invention.

A configuration of the refrigeration cycle apparatus according to Embodiment 3 will be described. FIG. 6 is a circuit diagram showing a configuration example of an air-cooled heat pump system including the refrigeration cycle apparatus according to Embodiment 3 of the present invention. In FIG. 6, load-side components are omitted. The air-cooled heat pump system shown in FIG. 6 is an example of a simplex pump system. The air-cooled heat pump system includes a refrigeration cycle apparatus 1b, which includes the heat source apparatuses 10a to 10c. Each of the heat source apparatuses 10a to 10c includes a pump 21 in addition to the components of the heat source apparatuses 10 described in Embodiment 1. According to Embodiment 3, the number of heat source apparatuses 10 is 3, and each of the heat source apparatuses 10 is provided with one pump 21.

A connection configuration of the water pipes in the air-cooled heat pump system will be described with reference to FIG. 6. The water return header pipe 23 is connected with water pipes 54a to 54c. The water pipe 54a is connected to the heat source apparatus 10a. The water pipe 54b is connected to the heat source apparatus 10b. The water pipe 54c is connected to the heat source apparatus 10c. The water delivery header pipe 22 is connected with water pipes 55a to 55c. The water pipe 55a is connected to the heat source apparatus 10a. The water pipe 55b is connected to the heat source apparatus 10b. The water pipe 55c is connected to the heat source apparatus 10c. According to Embodiment 3, the tank 33 connected to the water return header pipe 23 through the water pipe 53 may be either an open tank or a closed tank.

Next, configurations of the heat source apparatuses 10a to 10c will be described with reference to FIG. 6. In the heat source apparatuses 10a to 10c, components of a refrigerant circuit are connected by the refrigerant pipe 18 as described with reference to FIG. 1. Of the water pipes 34 and 35 connected to the water heat exchanger 15 in the heat source apparatus 10a, the water pipe 34 is connected with the water pipe 54a while the water pipe 35 is connected with the water pipe 55a. The water pipe 35 is provided with the outlet pressure sensor 41a. The water pipe 34 is provided with the pump 21a and with an inlet pressure sensor 42a configured to measure water pressure in the water pipe 34. The inlet pressure sensor 42a is provided on the side of a water inlet port of the pump 21a. The pump 21a is provided with the inverter 24a configured to drive a motor of the pump 21a.

Of the water pipes 34 and 35 connected to the water heat exchanger 15 in the heat source apparatus 10b, the water pipe 34 is connected with the water pipe 54b while the water pipe 35 is connected with the water pipe 55b. The water pipe 35 is provided with the outlet pressure sensor 41b. The water pipe 34 is provided with the pump 21b and with an inlet pressure sensor 42b configured to measure water pressure in the water pipe 34. The inlet pressure sensor 42b is provided on the side of a water inlet port of the pump 21b. The pump 21b is provided with the inverter 24b configured to drive a motor of the pump 21b.

Of the water pipes 34 and 35 connected to the water heat exchanger 15 in the heat source apparatus 10c, the water pipe 34 is connected with the water pipe 54c while the water pipe 35 is connected with the water pipe 55c. The water pipe 35 is provided with the outlet pressure sensor 41c. The water pipe 34 is provided with the pump 21c and with an inlet pressure sensor 42c configured to measure water pressure in the water pipe 34. The inlet pressure sensor 42c is provided on the side of a water inlet port of the pump 21c. The pump 21c is provided with the inverter 24c configured to drive a motor of the pump 21c. According to Embodiment 3, the water pipes 34 and 35 of the heat source apparatuses 10a to 10c, the water delivery header pipe 22, the water return header pipe 23, and the tank 33 are provided at a substantially equal height from the ground.

The heat source apparatuses 10a to 10c are provided with respective controllers 17a to 17c. The controllers 17b and 17c are connected to the controller 17a via signal lines. The controllers 17a to 17c are, for example, microcomputers. The controllers 17a to 17c have configurations similar to the controller 17 described in Embodiment 1, and differences from the controller 17 will mainly be described below.

The controller 17b controls a refrigeration cycle of a refrigerant circuit in the heat source apparatus 10b. The controller 17b is connected with the outlet pressure sensor 41b, inlet pressure sensor 42b, and inverter 24b via signal lines. The controller 17b transmits water pressure values measured by the outlet pressure sensor 41b and water pressure values measured by the inlet pressure sensor 42b to the controller 17a at every predetermined time interval. The controller 17c controls a refrigeration cycle of a refrigerant circuit in the heat source apparatus 10c. The controller 17c is connected with outlet pressure sensor 41c, inlet pressure sensor 42c, and inverter 24c via signal lines. The controller 17c transmits water pressure values measured by the outlet pressure sensor 41c and water pressure values measured by the inlet pressure sensor 42c to the controller 17a at every predetermined time interval.

The controller 17a controls a refrigeration cycle of a refrigerant circuit in the heat source apparatus 10a. The controller 17a is connected with outlet pressure sensor 41a, inlet pressure sensor 42a, inverter 24a, and bypass valve 32 via signal lines. The controller 17a calculates an average value APout of the water pressure values measured by the outlet pressure sensors 41a to 41c. Also, the controller 17a calculates an average value APin of the water pressure values measured by the inlet pressure sensors 42a to 42c. Then, the controller 17a calculates a pressure difference (APout−APin) between the average values. Furthermore, based on the determined pressure difference and the target value stored in the memory 71, the controller 17a controls the opening degree of the bypass valve 32 and controls the operating frequencies of the pumps 21a to 21c via the inverters 24a to 24c. When controlling the operating frequencies of the pumps 21b and 21c, the controller 17a transmits control information indicating the operating frequencies to the controllers 17b and 17c. Based on the control information received from the controller 17a, the controller 17b controls the operating frequency of the pump 21b via the inverter 24b. Based on the control information received from the controller 17a, the controller 17c controls the operating frequency of the pump 21c via the inverter 24c.

Note that although in Embodiment 3, description is given of a case in which the controller 17a controls the opening degree of the bypass valve 32 and the operating frequencies of the pumps 21a to 21c, this may be done by another controller. Also, a single controller having functions of the controllers 17a to 17c may be provided on the refrigeration cycle apparatus 1b instead of the controllers 17a to 17c. The object controlled to adjust the difference in water pressure between the headers may be at least any one of the bypass valve 32 and the pumps 21a to 21c in operation.

Figure 7:
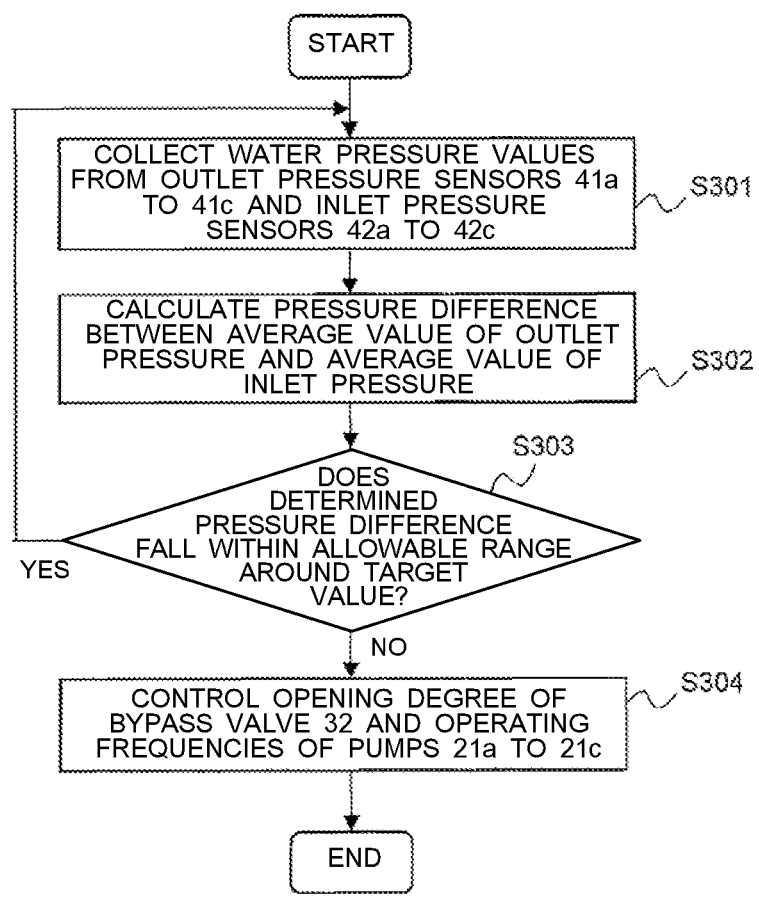
FIG. 7 is a flowchart showing operating procedures of the refrigeration cycle apparatus according to Embodiment 3 of the present invention.

Next, operation of the refrigeration cycle apparatus 1b of Embodiment 3 will be described. FIG. 7 is a flowchart showing operating procedures of the refrigeration cycle apparatus according to Embodiment 3 of the present invention. The controller 17a receives water pressure values from the outlet pressure sensor 41a and inlet pressure sensor 42a. Also, the controller 17a receives water pressure values measured by the outlet pressure sensors 41b and 41c and inlet pressure sensors 42b and 42c from the controllers 17b and 17c. In this way, in step S301 shown in FIG. 7, the controller 17a collects the water pressure values from the outlet pressure sensors 41a to 41c and inlet pressure sensors 42a to 42c at every predetermined time interval.

Next, the controller 17a calculates the average value APout of the water pressure values indicated by the outlet pressure sensors 41a to 41c and calculates the average value APin of the water pressure values indicated by the inlet pressure sensors 42a to 42c. Furthermore, the controller 17a calculates the pressure difference (APout−APin) between the average values (step S302).

According to Embodiment 3, the pumps 21a to 21c are provided in the heat source apparatuses 10a to 10c, respectively and the tank 33 connected to the water return header pipe 23 is either an open tank or a closed tank. Under these conditions, since the tank 33, the water return header pipe 23, the water delivery header pipe 22, and the water pipes 34 and 35 of the heat source apparatuses 10a to 10c are provided at a substantially equal height, the pressure difference between the average value of the water pressure indicated by the outlet pressure sensors 41a to 41c and the average value of the water pressure indicated by the inlet pressure sensors 42a to 42c is almost equal to a pressure difference between the water return header pipe 23 and water delivery header pipe 22.

The controller 17a compares the pressure difference calculated in step S302 with the target value stored in the memory 71 and determines whether the pressure difference falls within the allowable range from the target value (step S303). When it is found as a result of the determination that the pressure difference does not fall within the allowable range, the controller 17a controls the opening degree of the bypass valve 32 and the operating frequencies of the pumps 21a to 21c such that the pressure difference (APout−APin) is equal to the target value (step S304).

For example, when the pressure difference exceeds the allowable range, to decrease the pressure difference, the controller 17a increases the opening degree of the bypass valve 32 and reduces the operating frequency of at least one of the pumps 21a to 21c in operation. When the pressure difference is lower than the allowable range, to increase the pressure difference, the controller 17a reduces the opening degree of the bypass valve 32 and increases the operating frequency of at least one of the pumps 21a to 21c in operation. When it is found as a result of the determination in step S303 that the pressure difference falls within the allowable range, the controller 17a returns to step S301.

Note that when operation of any of the pumps 21a to 21c is stopped, operation of the controller 17a is similar to the operation described in Embodiment 2. For example, if the pump 21c is stopped while the pumps 21a and 21b are in operation, in step S302, the controller 17a calculates the pressure difference (APout−APin) between the two average values using the water pressure values indicated by the outlet pressure sensors 41a and 41b and inlet pressure sensors 42a and 42b. Also, in Embodiment 3, although description has been given of a case in which plural heat source apparatuses, namely three heat source apparatuses, are provided in the refrigeration cycle apparatus 1b, the number of heat source apparatuses is not limited to three. Furthermore, a single heat source apparatus may be provided on the refrigeration cycle apparatus 1b.

In the refrigeration cycle apparatus 1b of Embodiment 3, the heat source apparatus 10a includes the outlet pressure sensor 41a, pump 21a, and inlet pressure sensor 42a; and the controller 17a uses the pressure difference between the value of water pressure measured by the outlet pressure sensor 41a and the value of water pressure measured by the inlet pressure sensor 42a, as a value to be compared with the target value. In this case, even if the tank 33 is a closed tank, the pressure difference between the value of water pressure measured by the outlet pressure sensor 41a and the value of water pressure measured by the inlet pressure sensor 42a is equal to the pressure difference between the water pressure in the water return header pipe 23 and the water pressure in the water delivery header pipe 22. Therefore, if the controller 17a controls the opening degree of the bypass valve 32 and the operating frequency of the pump 21a using the pressure difference between the water pressure values indicated by the sensors, the difference in water pressure between the headers is adjusted and the need for the work of mounting a pressure difference gauge between the headers is eliminated. Consequently, advantageous effects similar to those of Embodiment 1 are available.

When the tank 33 is a closed tank, it is difficult for the controller 17 to predict the water pressure fluctuations occurring in the water return header pipe 20, but according to Embodiment 3, the inlet pressure sensors 42a to 42c are provided at water inlet ports of the pumps 21a to 21c. Consequently, the controller 17 can recognize any water pressure fluctuation occurring in the water return header pipe 20 based on the water pressure values measured by the inlet pressure sensors 42a to 42c.

Also, when the refrigeration cycle apparatus 1b includes a plurality of the heat source apparatuses 10a equipped with the outlet pressure sensor 41a, pump 21a, and inlet pressure sensor 42a, the controller 17a can use the pressure difference between the average value of the water pressure values collected from the plural outlet pressure sensors 41a to 41c and the average value of the water pressure values collected from the plural inlet pressure sensors 42a to 42d as a value to be compared with the target value. In this case, the controller 17a can adjust any difference in water pressure between the headers by controlling the opening degree of the bypass valve 32 and the operating frequencies of the pumps 21a to 21c using the pressure difference (APout−APin) between the two average values. This eliminates the need for the work of installing a pressure difference gauge between the headers and provides advantageous effects similar to those of Embodiment 1 even though there are plural heat source apparatuses.

Note that in Embodiment 1, by being provided with the inlet pressure sensor 42a at the water inlet port of the pump 21, the controller 17 may control one or both of the opening degree of the bypass valve 32 and the operating frequency of the pump 21 using the water pressure values indicated by the inlet pressure sensor 42a and outlet pressure sensor 41 as with Embodiment 3. Also, in Embodiment 2, the inlet pressure sensor 42a may be provided at the water inlet port of the pump 21a, and the inlet pressure sensor 42b may be provided at the water inlet port of the pump 21b. In that case, as with Embodiment 3, the controller 17a may control at least any one of the opening degree of the bypass valve 32 and the operating frequencies of the pumps 21a and 21b using the water pressure values indicated by the inlet pressure sensors 42a and 42b and the outlet pressure sensors 41a to 42d.

Embodiment 4

In Embodiment 4, a refrigeration cycle apparatus includes the heat source apparatuses 10a to 10c described in Embodiment 3, but the inlet pressure sensors 42a to 42c are not provided. In Embodiment 4, components similar to those in Embodiments 1 to 3 are denoted by the same reference numerals as the corresponding components in Embodiments 1 to 3, and detailed description thereof will be omitted. However, if components denoted by the same reference numerals as components described in Embodiments 1 to 3 differ partially from the corresponding components, the differences will be described in detail.

Figure 8:
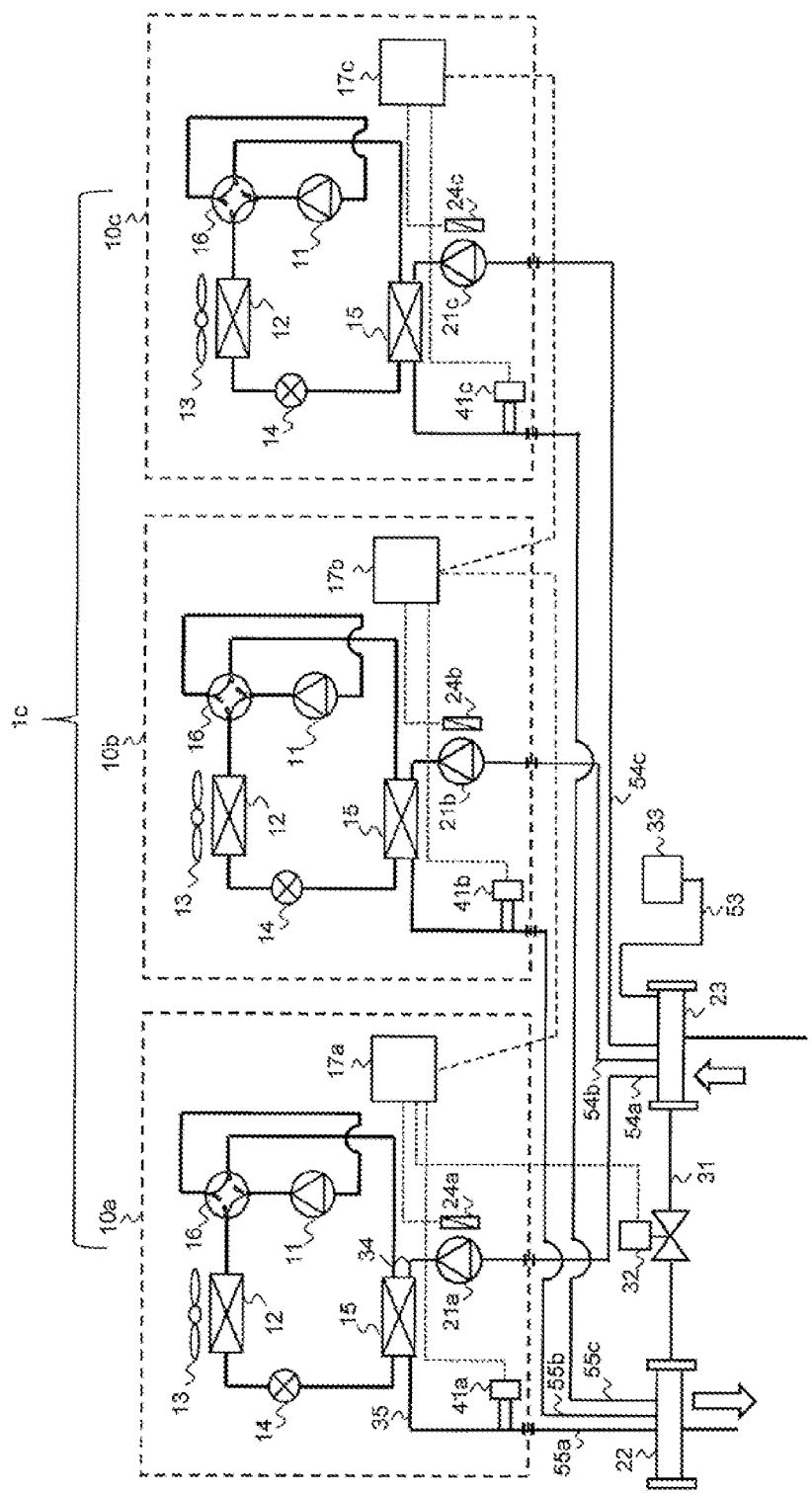
FIG. 8 is a circuit diagram showing a configuration example of an air-cooled heat pump system including a refrigeration cycle apparatus according to Embodiment 4 of the present invention.

A configuration of the refrigeration cycle apparatus according to Embodiment 4 will be described. FIG. 8 is a circuit diagram showing a configuration example of an air-cooled heat pump system including the refrigeration cycle apparatus according to Embodiment 4 of the present invention. In FIG. 8, load-side components are omitted. The air-cooled heat pump system shown in FIG. 8 is an example of a simplex pump system. The air-cooled heat pump system includes a refrigeration cycle apparatus 1c, which includes the heat source apparatuses 10a to 10c. Except that the tank 33 connected to the water return header pipe 23 through the water pipe 53 is an open tank, a connection configuration of the water pipes in the air-cooled heat pump system is similar to the configuration described with reference to FIG. 6, and thus detailed description thereof will be omitted.

Next, configurations of the heat source apparatuses 10a to 10c will be described in comparison with the configurations shown in FIG. 6. According to Embodiment 3, the heat source apparatuses 10a to 10c are not provided with the inlet pressure sensors 42a to 42c shown in FIG. 6. The controller 17a calculates the average value of the water pressure values measured by the outlet pressure sensors 41a to 41c, controls the opening degree of the bypass valve 32 and the operating frequencies of the pumps 21a to 21c via the inverters 24a to 24c, based on the average value and the target value stored in the memory 71. When controlling the operating frequencies of the pumps 21b and 21c, the controller 17a transmits control information indicating the operating frequencies to the controllers 17b and 17c. Based on the control information received from the controller 17a, the controller 17b controls the operating frequency of the pump 21b via the inverter 24b. Based on the control information received from the controller 17a, the controller 17c controls the operating frequency of the pump 21c via the inverter 24c. According to Embodiment 4, the water pipes 34 and 35 of the heat source apparatuses 10a to 10c, the water delivery header pipe 22, the water return header pipe 23, and the tank 33 are provided at a substantially equal height from the ground.

Note that although in Embodiment 4, description is given of a case in which the controller 17a controls the opening degree of the bypass valve 32 and the operating frequencies of the pumps 21a to 21c, this may be done by another controller. Also, a single controller having functions of the controllers 17a to 17c may be provided on the refrigeration cycle apparatus 1c instead of the controllers 17a to 17c. The object controlled to adjust the difference in water pressure between the headers may be any one of the bypass valve 32 and the pumps 21a to 21c in operation.

Next, operation of the refrigeration cycle apparatus 1c of Embodiment 4 will be described. The operation of the refrigeration cycle apparatus 1c of Embodiment 4 involves procedures similar to those shown in FIG. 5, and thus will be described with reference to FIG. 5.

In step S201 shown in FIG. 5, at every predetermined time interval, the controller 17a receives a water pressure value from the outlet pressure sensor 41a, and the water pressure values measured by the outlet pressure sensors 41b and 41c from the controllers 17b and 17c, and thereby collects the water pressure values from the outlet pressure sensors 41a to 41c. Then, in step S202, the controller 17a calculates the average value of the collected water pressure values.

According to Embodiment 4, the pumps 21a to 21c are provided in the heat source apparatuses 10a to 10c, respectively. Also, the tank 33 connected to the water return header pipe 23 is an open tank. Under these conditions, since the tank 33, the water return header pipe 23, the water delivery header pipe 22, and the water pipes 34 and 35 of the heat source apparatuses 10a to 10c are provided at a substantially equal height, water pressure in the water pipes 54a to 54c running from the water return header pipe 23 to the pumps 21a to 21c is almost equal to zero. Consequently, the average value of the water pressure values measured by the outlet pressure sensors 41a to 41c is equal to the pressure difference between the water pressure in the water delivery header pipe 22 and the water pressure in the water return header pipe 23.

The controller 17a compares the average value calculated in step S202 with the target value stored in the memory 71 and determines in step S203 whether the average value falls within the allowable range from the target value. When it is found as a result of the determination that the average value does not fall within the allowable range, in step S204, the controller 17a controls the opening degree of the bypass valve 32 and the operating frequencies of the pumps 21a to 21c such that the average value of the water pressure values measured by the outlet pressure sensors 41a to 41c is equal to the target value.

For example, when the average value exceeds the allowable range, to decrease the pressure difference, the controller 17a increases the opening degree of the bypass valve 32 and reduces the operating frequency of at least one of the pumps 21a to 21c in operation. When the average value is lower than the allowable range, to increase the pressure difference, the controller 17a reduces the opening degree of the bypass valve 32 and increases the operating frequency of at least one of the pumps 21a to 21c in operation. When it is found as a result of the determination in step S203 that the average value falls within the allowable range, the controller 17a returns to step S201.

Note that when operation of any of the pumps 21a to 21c is stopped, operation of the controller 17a is similar to the operation described in Embodiment 2. For example, if the pump 21c is stopped while the pumps 21a and 21b are in operation, in step S202, the controller 17a calculates the average value using the water pressure values indicated by the outlet pressure sensors 41a and 41b. Also, in Embodiment 4, although description has been given of a case in which plural heat source apparatuses, namely three heat source apparatuses, are provided on the refrigeration cycle apparatus 1c, the number of heat source apparatuses is not limited to three. Furthermore, a single heat source apparatus may be provided on the refrigeration cycle apparatus 1c.

In the refrigeration cycle apparatus 1c of Embodiment 4, the heat source apparatus 10a includes the outlet pressure sensor 41a and pump 21a, and the controller 17a uses the value of water pressure measured by the outlet pressure sensor 41a as a value to be compared with the target value. In this case, the value of water pressure measured by the outlet pressure sensor 41a is equal to the pressure difference between the water pressure in the water return header pipe 23 and the water pressure in the water delivery header pipe 22. Therefore, if the controller 17a controls the opening degree of the bypass valve 32 and the operating frequency of the pump 21a using the measured water pressure values, the difference in water pressure between the headers is adjusted. This eliminates the need for the work of mounting a pressure difference gauge between the headers and provides advantageous effects similar to those of Embodiment 1.

Also, when the refrigeration cycle apparatus 1c includes a plurality of the heat source apparatuses 10a equipped with the outlet pressure sensor 41a and pump 21a, the controller 17a can use the average value of the water pressure values collected from the plural outlet pressure sensors 41a to 41c as a value to be compared with the target value. In this case, if the controller 17a controls the opening degree of the bypass valve 32 and the operating frequencies of the pumps 21a to 21c using the average value of the water pressure values, the difference in water pressure between the headers is adjusted. This eliminates the need for the work of installing a pressure difference gauge between the headers and provides advantageous effects similar to those of Embodiment 1 even though there are plural heat source apparatuses.

Figure 9:
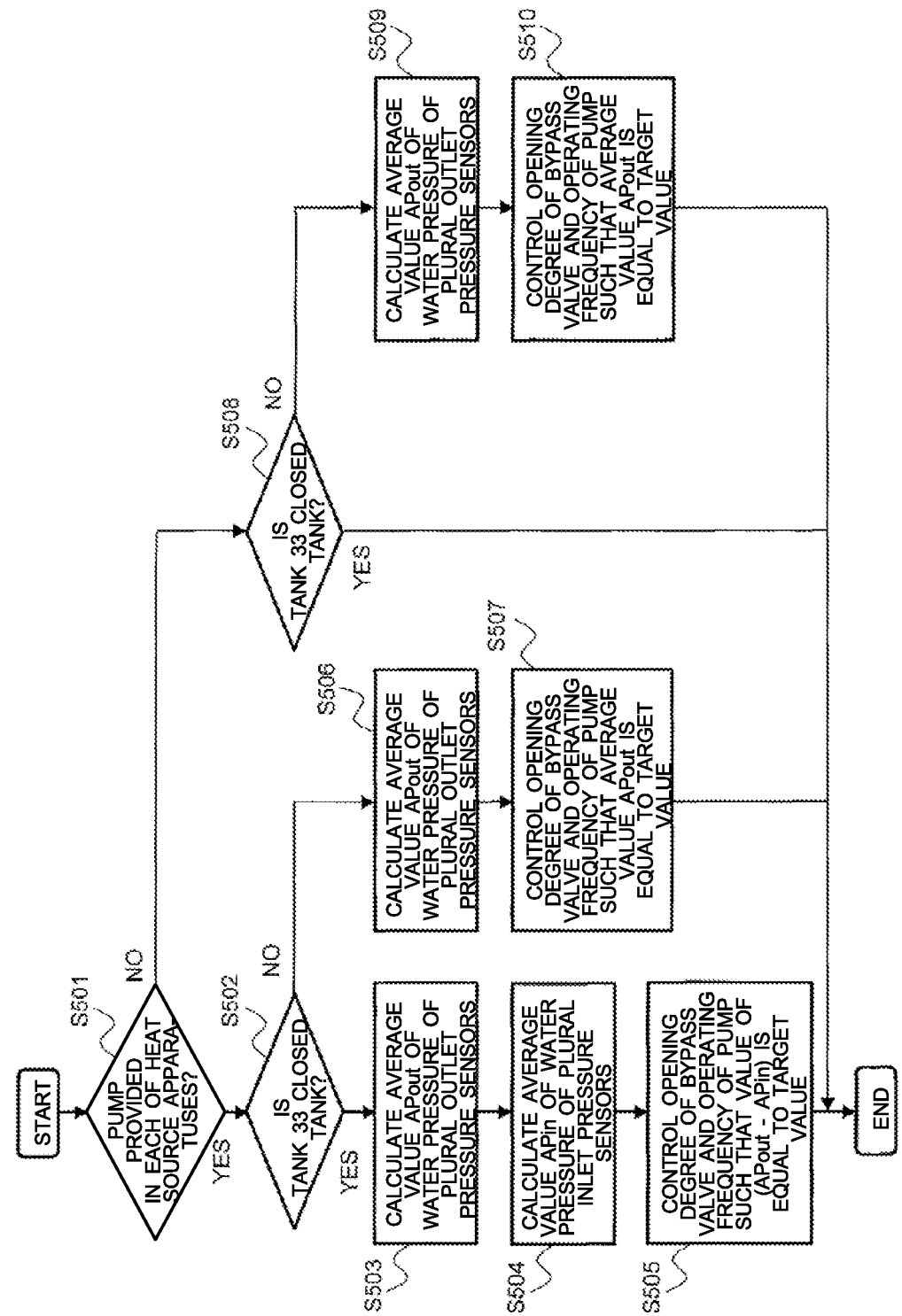
FIG. 9 is a flowchart showing operating procedures carried out by the controller of the refrigeration cycle apparatus shown in FIG. 1 when customization settings of the air-cooled heat pump system are made.

Note that by making customization settings of the air-cooled heat pump system to the controller 17, the operator can make the controller 17 perform control described in any of Embodiments 1 to 4. Operating procedures for this will be described by assuming the use of the controller 17 shown in FIG. 1. FIG. 9 is a flowchart showing operating procedures carried out by the controller of the refrigeration cycle apparatus shown in FIG. 1 when customization settings of the air-cooled heat pump system are made. Description will be given here of a case in which plural heat source apparatuses 10 are provided in the refrigeration cycle apparatus 1, but the number of heat source apparatuses 10 may be one.

In step S501, the controller 17 determines whether the pump 21 is provided on each of plural heat source apparatuses 10 to send water to the plural heat source apparatuses 10 from the water return header pipe 23. When the pump 21 is provided in each heat source apparatus 10, the controller 17 proceeds to the determination process of step S502. On the other hand, when the pump 21 is provided outside the heat source apparatuses 10, the controller 17 proceeds to the determination process of step S508.

When it is determined in step S501 that the pump 21 is provided in each heat source apparatus 10, the controller 17 determines whether the tank 33 is a closed tank (step S502). When the tank 33 is a closed tank, the controller 17 performs the control described in Embodiment 3. To describe this with reference to FIG. 9, in step S503, the controller 17 calculates the average value APout of the water pressure values measured by plural outlet pressure sensors. Next, the controller 17 calculates the average value APin of the water pressure values measured by plural inlet pressure sensors (step S504). Subsequently, the controller 17 controls the opening degree of the bypass valve 32 and the operating frequency of the pump 21 such that the value of (APout−APin) is equal to the target value (step S505).

When it is determined in step S502 that the tank 33 is not a closed tank, the controller 17 performs the control described in Embodiment 4. To describe this with reference to FIG. 9, in step S506, the controller 17 calculates the average value of the water pressure values measured by plural outlet pressure sensors. Next, the controller 17 controls the opening degree of the bypass valve 32 and the operating frequency of the pump 21 such that the average value is equal to the target value (step S507).

On the other hand, when it is determined in step S501 that the pump 21 is provided outside the heat source apparatuses 10, the controller 17 determines whether the tank 33 is a closed tank (step S508). When the tank 33 is not a closed tank, the controller 17 performs the control described in Embodiment 2. To describe this with reference to FIG. 9, in step S509, the controller 17 calculates the average value of the water pressure values measured by plural outlet pressure sensors. Next, the controller 17 controls the opening degree of the bypass valve 32 and the operating frequency of the pump 21 such that the average value is equal to the target value (step S510).

Note that in the flowchart shown in FIG. 9, if plural pumps 21 are provided, in the calculation processes of step S503, S504, S506, and S509 shown in FIG. 9, to calculate the average value of the water pressure values, the controller 17 uses the water pressure values received from the pressure sensors provided on the heat source apparatuses 10 of the water heat exchangers 15 supplied with water from the pumps 21 in operation.

In this way, based on customization settings made in advance for the air-cooled heat pump system, the controller 17 can select the values used to monitor the pressure difference between the water pressure in the water return header pipe 23 and the water pressure in the water delivery header pipe 22, as appropriate.

REFERENCE SIGNS LIST 1, 1a to 1c refrigeration cycle apparatus 10, 10a to 10d heat source apparatus 11 compressor 12 air heat exchanger 13 fan 14 expansion valve 15 water heat exchanger 16 four-way valve 17, 17a to 17d controller 18 refrigerant pipe 19 signal line 20 water return header pipe 21, 21a to 21c pump 22 water delivery header pipe 23 water return header pipe 24, 24a to 24c inverter 25 water return header pipe 31 bypass pipe 32 bypass valve 33 tank 34, 35 water pipe 41, 41a to 41d outlet pressure sensor 42a to 42c inlet pressure sensor 51 to 54, 54a to 54c water pipe 55, 55a to 55c water pipe 56a to 56d, 57a to 57d branch pipe 60 fan coil unit 61 heat exchanger 62 fan 63 on-off valve 71 memory 72 CPU

The invention claimed is:

1. A refrigeration cycle apparatus that is connected to a load through a water return header pipe and a water delivery header pipe connected with each other by a bypass pipe at which a bypass valve is provided, the refrigeration cycle apparatus comprising:
a compressor configured to compress refrigerant and discharge the refrigerant to a refrigerant pipe;
an air heat exchanger configured to exchange heat between air and the refrigerant flowing through the refrigerant pipe;
an expansion valve configured to adjust pressure of the refrigerant flowing through the refrigerant pipe;
a water heat exchanger configured to exchange heat between water supplied from the water return header pipe and the refrigerant and send out the water to the water delivery header pipe;
an outlet pressure sensor provided on a water outlet side of the water heat exchanger and configured to measure water pressure; and
a controller configured to control the compressor and the expansion valve,
wherein
an open tank is connected to the water return header pipe via a water pipe, the open tank being used for water replenishment,
the water heat exchanger, a water pipe connected to the water heat exchanger, the water return header pipe and the water delivery header pipe are provided at a substantially equal height from the ground such that a difference in a maximum height and a minimum height of the water heat exchanger, the water pipe connected to the water heat exchanger, the water return header pipe, and the water delivery header pipe is no greater than 100 centimeters, and the controller is configured to control an opening degree of the bypass valve such that a value of water pressure measured by the outlet pressure sensor is equal to a preset target value.

2. The refrigeration cycle apparatus of claim 1, wherein the controller
is connected via a signal line with a pump configured to send out water from the water return header pipe to the water heat exchanger, and
is configured to control the opening degree of the bypass valve and an operating frequency of the pump such that the water pressure value is equal to the target value.

3. The refrigeration cycle apparatus of claim 1, wherein the controller
is connected via a signal line with an inlet pressure sensor configured to measure water pressure, the inlet pressure sensor being provided at a water inlet port of a pump configured to send out water from the water return header pipe to the water heat exchanger, and
is configured to control the opening degree of the bypass valve such that a pressure difference between the value of water pressure measured by the outlet pressure sensor and value of water pressure measured by the inlet pressure sensor is equal to the target value.

4. The refrigeration cycle apparatus of claim 1, further comprising a plurality of heat source apparatuses each including the compressor, the air heat exchanger, the expansion valve, the water heat exchanger, and the outlet pressure sensor, wherein
the controller is configured to use, as the water pressure value to be compared with the target value, an average of values of water pressure collected from a plurality of the outlet pressure sensors.

5. The refrigeration cycle apparatus of claim 2, further comprising a heat source apparatus including the compressor, the air heat exchanger, the expansion valve, the water heat exchanger, the outlet pressure sensor, and the pump, wherein
the controller is configured to control the opening degree of the bypass valve and the operating frequency of the pump such that the value of water pressure measured by the outlet pressure sensor is equal to the target value.

6. The refrigeration cycle apparatus of claim 5, comprising a plurality of the heat source apparatuses, wherein
the controller is configured to use, as the water pressure value to be compared with the target value, an average of values of water pressure collected from a plurality of the outlet pressure sensors.

7. The refrigeration cycle apparatus of claim 3, further comprising a heat source apparatus including the compressor, the air heat exchanger, the expansion valve, the water heat exchanger, the outlet pressure sensor, the pump, and the inlet pressure sensor.

8. The refrigeration cycle apparatus of claim 7, wherein the controller
is connected with the pump via a signal line, and
is configured to control the opening degree of the bypass valve and an operating frequency of the pump such that the pressure difference between the value of water pressure measured by the outlet pressure sensor and the value of water pressure measured by the inlet pressure sensor is equal to the target value.

9. The refrigeration cycle apparatus of claim 8, comprising a plurality of the heat source apparatuses, wherein
the controller is configured to use, as the pressure difference, a pressure difference between an average of values of water pressure collected from a plurality of the outlet pressure sensors and an average of values of water pressure collected from a plurality of the inlet pressure sensors.

10. The refrigeration cycle apparatus of claim 1, wherein
the controller is configured to control an opening degree of the bypass valve such that the value of water pressure measured by the outlet pressure sensor is equal to the preset target value without directly measuring a pressure of the bypass pipe, the water return header pipe, and the water delivery header pipe.

11. The refrigeration cycle apparatus of claim 1, wherein
the outlet pressure sensor is provided on a pipe extending between the water outlet side of the water heat exchanger and the water delivery header pipe.

12. The refrigeration cycle apparatus of claim 1, further comprising a heat source apparatus, wherein
the outlet pressure sensor and the water heat exchanger are housed by the heat source apparatus.

13. The refrigeration cycle apparatus of claim 1, further comprising a heat source apparatus, wherein
the outlet pressure sensor is provided in the heat source apparatus.

14. The refrigeration cycle apparatus of claim 1, wherein
the controller is configured to correct the present target value by converting a difference in an installation height into water pressure based on a positional relationship of the water heat exchanger, the water pipe connected to the water heat exchanger, the water return header pipe, the water delivery header pipe, and the open tank.

15. The refrigeration cycle apparatus of claim 1, wherein
the open tank is arranged between 100 and 200 centimeters above the highest of the water heat exchanger, the water pipe connected to the water heat exchange, the water delivery header pipe, and the water return header pipe.

* * * * *